Patented Oct. 25, 1949

2,486,344

UNITED STATES PATENT OFFICE 2,486,344

HECTOGRAPH BLANKET AND METHOD OF PREPARING THE SAME

Robert W. Tatge, Chicago, Ill., assignor to Ditto, Incorporated, Chicago, Ill., a corporation of West Virginia No Drawing. Application October 31, 1945, Serial No. 625,953

4 Claims. (Cl. 117—35.6)

The invention relates to composite bonded sheet material and more particularly to hectograph blankets and to methods for preparing the same.

Hectograph blankets generally comprise a gelatinous copy mass secured to a flexible backing. Heretofore the backing has been secured to the copy mass by means of a bonding agent which has tanning characteristics such as, for example, linseed oil or other drying oils. An agent with oxidative or drying properties necessitates festooning of the paper or cloth for a period of from 24 to 48 hours, during which time the oil ages to the point where manufacture may be begun. After this preliminary conditioning period, the coated backing had a useful life of only a few days. Such bonding compositions have the inherent disadvantages that they cause progressive and uncontrollable tanning of the overlying hectograph copy mass, with the result that after a period of time the hectograph copy mass becomes so hard that it is not commercially useable.

In some cases non-tanning bonding compositions have been used as, for example, the sulphonated castor oil disclosed in the Hoskins Patent 2,098,662, and the carboxylic acids and salts of carboxylic acids disclosed in the Bour Patents 2,240,029 and 2,260,506. The sulphonated oil compositions while in general suitable are mordants for basic dyes and thus inhibit clearing of the hectograph composition. The carboxylic type compositions while also in general suitable, did not come up to commercial expectations, mainly because the naphthenic acids which were the best of the type from the point of view of bonding ability varied in properties depending upon the source and therefore uniform results were not obtained.

An object of this invention is therefore to provide means for obtaining a bond between a gelatinous copy mass and a flexible backing without the difficulties encountered in the methods hitherto employed.

The main advantages of my invention are (1) the elimination of the festooning of the backing; (2) the absence of penetration of the oil into the paper with the resultant loss of bond; (3) a firm, uniform, and fast-drying coating that permits use of the backing immediately after processing; and (4) an easily adjustable synthetic bonding coating not subject to seasonal variations as are the natural drying oils, without the problem of aging presenting an unserviceable product.

I have found that the esters of monohydroxy alcohols and saturated or unsaturated fatty acids containing more than 6 carbon atoms in an unbroken chain attached to a carboxyl group are effective bonding agents when used alone or in combination with other ingredients as the intermediate bonding film or layer of a hectograph blanket. Suitable esters include butyl stearate, butyl oleate, methyl oleate, amyl stearate, butyl ricinoleate, ethyl caproate, lauryl laurate, and octyl myristate.

A preferred coating composition for bonding purposes comprises a solution of a cellulose ester such as cellulose acetate or cellulose nitrate, in a volatile solvent for the cellulose ester such as ethyl acetate, along with a fatty acid ester bonding agent which is also a plasticizer for the cellulose ester. Such plasticizer ester bonding agents include esters obtained by reacting monohydroxy alcohols having less than 20 carbon atoms with higher fatty acids containing less than 20 carbon atoms bonded to a carboxyl group. Plasticizers, such as dibutyl phthalate, in which the ester is soluble, may also be present in the composition. Other carriers besides the cellulose ester composition may be used as a carrier for the ester bonding agent. Any material which will form an insoluble film that adheres to cloth or paper may be used as a medium. This includes ethyl cellulose, cellulose acetate-butyrate, zein, and the like. Organic plastics soluble in organic solvents are preferred but water soluble film forming materials such as gelatin or casein which may be rendered insoluble by tanning agents may also be used although it is more difficult to uniformly incorporate the ester bonding agent in such materials. The ester bonding agent may be present in any proportion in the carrier composition and even may be used by itself without the carrier although this is not preferred. For must purposes the ester is present in from about 5% by weight to 50% by weight of the carrier composition after evaporation of the volatile solvents.

The coating composition containing the ester bonding agent may be applied to the flexible backing such as paper or cloth by any conventional method such as doctoring or roller coating. The gelatinous copy mass may then be applied upon the coated backing as a hot melt. Within a few minutes an extremely firm bond is secured between the gelatin and the backing material.

The invention is applicable to all types of gelatin containing compositions for which it is desired to obtain an efficient bond to a backing of paper, cloth, metal or the like. However, the invention is particularly applicable to secure hectograph compositions to paper or cloth backings. These hectograph compositions, as is well known in the art, are gelatin gels containing a major proportion of a relatively non-volatile water soluble material such as glycerin. For example, hectograph blankets generally contain to one part by weight of gelatin 5 to 20 parts by weight of glycerin, and from one to three parts by weight of water. A suitable composition may be prepared from one part of gelatin, 15 parts of glycerin and 1 part of water. Minor proportions of tanning agents based on the gelatin are also incorporated in the mixture. Formaldehyde, aluminum alums, chrome alums and potassium and ammonium dichromates may be used. For example, .001 to .01 of potassium dichromate may be incorporated in the gelatinous mass.

To more clearly set forth the practice in accordance with the invention, and to more specifically point out the nature of the product and process contemplated thereby, several specific, illustrative examples of ester bonding compositions are hereinafter set forth, it being understood that these examples illustrate several embodiments which have given satisfactory results and are not intended to restrict the invention thereto.

*Example I*

A composition of:

| | Parts |
|---|---|
| ½ second nitrocellulose | 20 |
| Butyl stearate | 10 |
| Ethyl acetate | 50 |
| Butyl acetate | 20 |

*Example II*

A composition of:

| | Parts |
|---|---|
| Ethyl cellulose | 20 |
| Octyl myristate | 15 |
| Toluol | 45 |
| Methanol | 20 |

*Example III*

A composition of:

| | Parts |
|---|---|
| Zein | 15 |
| Methyl oleate | 5 |
| Ethanol | 65 |
| Water | 15 |

While there have been shown and described certain embodiments of the invention, it is to be understood that it is capable of many modifications. Changes, therefore, may be made without departing from the spirit and scope of the invention as described, and it is the intention to claim all novelty inherent in the invention as broadly as possible in view of the prior art.

I claim:

1. A hectograph blanket comprising a gelatin containing gelatinous copy mass and a backing having a coating in contact with said copy mass of a composition comprising a cellulose ester, a plasticizer and at least 5% by weight of an aliphatic ester of a monohydroxy aliphatic alcohol and having less than 20 carbon atoms and a fatty acid having more than 6 carbon atoms and less than 20 carbon atoms in an unbroken chain bonded to a carboxyl group.

2. A hectograph blanket comprising a gelatin containing gelatinous copy mass and a backing having a coating in contact with said copy mass of a composition comprising a cellulose ester and at least 5% by weight of an aliphatic ester of a monohydroxy aliphatic alcohol having less than 20 carbon atoms and of a higher fatty acid having more than six and less than 20 carbon atoms bonded to a carboxyl group.

3. A hectograph blanket comprising a copy mass of a tanned gelatin gel containing a major proportion of glycerin, and a fibrous backing in contact with said copy mass coated with a composition consisting of nitrocellulose, and from 5% to 50% by weight of butyl stearate.

4. The method of preparing a hectograph blanket which comprises applying to a backing a solution of nitrocellulose, a volatile solvent, and at least 5% by weight of an aliphatic ester of a monohydroxy alcohol and a fatty acid having less than 20 carbon atoms in the alcohol part of the ester and between 6 and 20 carbon atoms bonded to a carboxyl group in the acid chain part of the ester, evaporating the volatile solvent and applying a hot gelatin containing sol adapted to form a gel on cooling to said coated backing, and allowing the sol to set to a gel.

ROBERT W. TATGE.

REFERENCES CITED

The following references are of record in the file of this patent:

UNITED STATES PATENTS

| Number | Name | Date |
|---|---|---|
| 1,779,299 | Valentine | Oct. 21, 1930 |
| 2,368,583 | Tatge | Jan. 30, 1945 |